(12) United States Patent
Gebke et al.

(10) Patent No.: US 6,626,754 B2
(45) Date of Patent: Sep. 30, 2003

(54) CONICAL AIR FILTER

(75) Inventors: Kevin Gebke, Dubuque, IA (US); Cary W. Pinkalla, Milwaukee, WI (US)

(73) Assignee: Rite-Hite Holding Corporation, Milwaukee, WI (US)

( * ) Notice: Subject to any disclaimer, the term of this patent is extended or adjusted under 35 U.S.C. 154(b) by 0 days.

(21) Appl. No.: 09/916,987

(22) Filed: Jul. 27, 2001

(65) Prior Publication Data

US 2003/0022617 A1 Jan. 30, 2003

(51) Int. Cl.$^7$ .................................................. F24F 7/00
(52) U.S. Cl. ........................................ 454/306; 454/903
(58) Field of Search .............................. 454/306, 296, 454/903; 55/385.2, 410, 416

(56) References Cited

U.S. PATENT DOCUMENTS

| | | | |
|---|---|---|---|
| 1,319,267 A | * 10/1919 | Brown | ........................ 454/175 |
| 2,466,362 A | * 4/1949 | Blake et al. | ............... 236/44 R |
| 2,853,154 A | 9/1958 | Rivers | |
| 3,151,962 A | 10/1964 | O'Dell | |
| 3,195,296 A | 7/1965 | Janson | |
| 3,204,391 A | * 9/1965 | Schwab | ........................ 210/315 |
| 3,204,392 A | * 9/1965 | Schwab | ........................ 210/447 |
| 3,357,088 A | 12/1967 | Hoffman | |
| 3,396,517 A | 8/1968 | Schwab | |
| 3,538,686 A | 11/1970 | Schwab | |
| 3,870,495 A | * 3/1975 | Dixson et al. | ............... 454/158 |
| 4,015,961 A | * 4/1977 | Howard et al. | ............. 285/189 |
| 4,048,911 A | * 9/1977 | Petersen | ...................... 454/136 |
| 4,170,930 A | * 10/1979 | Lind | ........................... 454/297 |
| 4,805,521 A | * 2/1989 | Eckebring et al. | ........... 454/284 |
| 5,490,813 A | * 2/1996 | Danielsen et al. | ........... 454/296 |
| 5,618,324 A | 4/1997 | Sommer | |
| 5,655,963 A | * 8/1997 | Paschke et al. | .............. 454/297 |
| 5,690,720 A | 11/1997 | Spero | |
| 5,769,708 A | * 6/1998 | Paschke | ....................... 454/296 |

OTHER PUBLICATIONS

International Search Report from PCT/US02/23372.

* cited by examiner

*Primary Examiner*—Derek Boles
(74) *Attorney, Agent, or Firm*—Marshall, Gerstein & Borun LLP

(57) ABSTRACT

An air duct system includes a conical fabric filter disposed within a cylindrical air duct. In some embodiments, both the filter and the air duct are inflatable. A fabric collar and a pair of zippers not only allow the filter to be readily removed for cleaning, but also allow the air duct system to continue operating with the filter removed. Pleats can provide the filter with more surface area, and the pleats can be interconnected in an alternating pattern to inhibit the filter from over inflating.

10 Claims, 5 Drawing Sheets

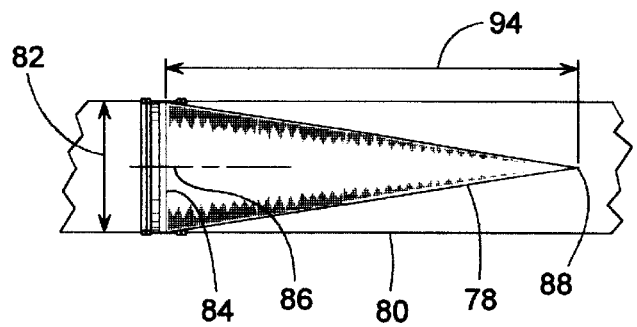
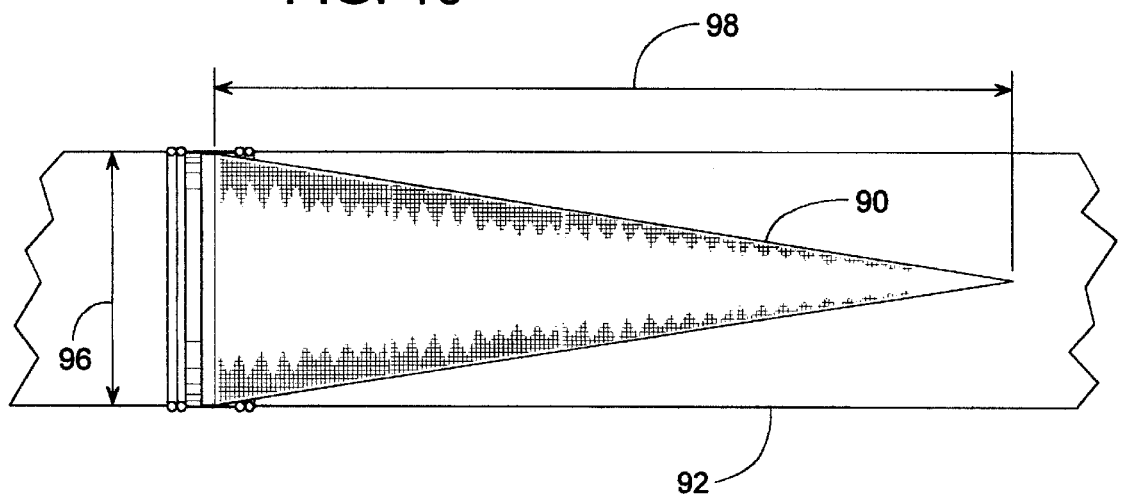

CONICAL AIR FILTER

BACKGROUND OF THE INVENTION

1. Field of the Invention

The subject invention generally pertains to air filters and more specifically to a fabric filter for use inside an air duct.

2. Description of Related Art

Fans or blowers are used along with ductwork to circulate air through a room or area of a building. The blower typically draws air from within the room through a return air duct and then forces the air back into the room through a supply air duct. To heat or cool the air, the blower may also force or draw the air across a heat exchanger.

To help prevent dust from accumulating on the heat exchanger, blower, and ductwork, often a conventional filter is installed at the downstream end of the return air duct. Finer, less porous filters are used where dust removal is more critical, such as in so called clean rooms or in buildings having occupants with dust-related allergies. Unfortunately, fine filters usually create a higher pressure drop that reduces the amount of airflow. To minimize the pressure drop, a filter's effective cross-sectional area can be increased in various ways, such as by adding pleats to the filter, installing the filter at an angle relative to the duct, or by forming the filter as an elongated bag that extends lengthwise into an air duct.

Some examples of filters that are elongated along the direction of airflow are disclosed in U.S. Pat. Nos. 2,853,154; 3,151,962; 3,195,296; 3,204,391; 3,204,392; 3,396,517; and 3,538,686. When mounting such filters within a return air duct, upstream of the blower, a significant distance is needed between the blower and where the filter attaches to the duct, simply due to the length of the filter. In many cases, this can be difficult or impossible to do, because of bends or elbows in the ductwork. Also, much of the ductwork is usually inaccessible, as it is often installed within the walls of the building or between the floor and ceiling. So filters in a return air duct are typically installed immediately adjacent the blower, which may prohibit the use of an elongated filter or at least significantly limit its length.

On the other hand, if an elongated air filter were installed in the supply air duct, the filter would do little in preventing dust from accumulating on the blower and the heat exchanger, because dust often originates in the room. With a filter installed in the supply air duct, dust from the room could pass across the blower and heat exchanger before ever reaching the filter.

Moreover, if elongated filters of current designs were installed within a generally cylindrical duct having a pliable fabric wall, the non-conical shape of the filter may cause the fabric of the duct to flutter, due to uneven patterns of airflow velocity. If the cross-sectional area of airflow between the exterior of an elongated filter and the interior of the cylindrical fabric duct is not circumferentially uniform, as could be the case with a flat-sided filter within a cylindrical duct, localized areas of higher velocity may exist. Also, abrupt changes in velocity along the length of a fabric duct may also cause the fabric to flutter.

SUMMARY OF THE INVENTION

In some embodiments, an air duct system includes a conical filter disposed within a cylindrical duct.

In some embodiments, an air duct system includes an inflatable conical filter with pleats.

In some embodiments, the pleats are interconnected in an alternating pattern of connection points to inhibit the filter from billowing excessively outward.

In some embodiments, an air duct system includes a blower and a heat exchanger interposed between an upstream pre-filter and a downstream conical filter, which is less porous.

In some embodiments, an inflatable fabric filter is disposed within an inflatable fabric air duct.

In some embodiments, the fabric wall of the air duct is air permeable.

In some embodiments, the integrity of a fabric air duct can be maintained regardless of whether the elongated filter is attached to the duct.

In some embodiments, a zipper removably attaches an elongated filter to a fabric air duct.

In some embodiments, a plurality of conical filters have the same length to diameter ratio even though the filters are of different diameters for various diameter air ducts.

BRIEF DESCRIPTION OF THE DRAWINGS

FIG. 9 shows one of a plurality of conical air filters.

FIG. 10 is similar to FIG. 9, but showing a larger filter with the same length to diameter ratio.

DESCRIPTION OF THE PREFERRED EMBODIMENT

Figure 1:
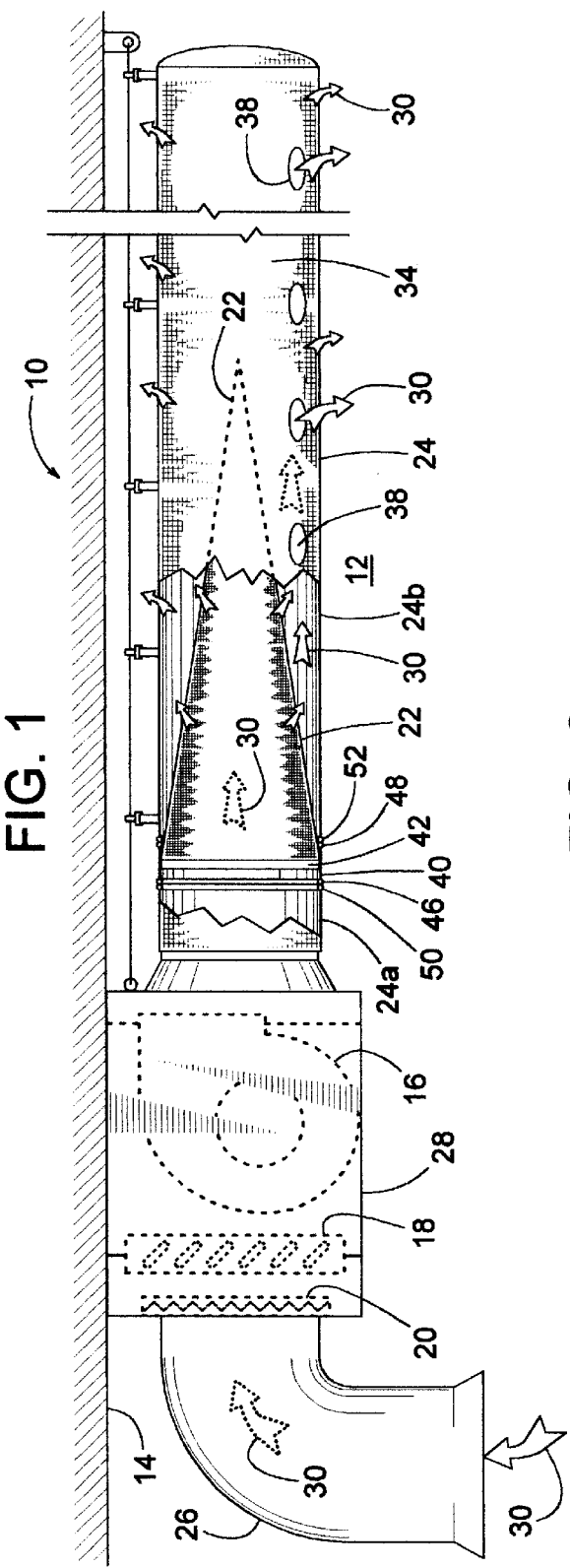
FIG. 1 is a cutaway view of an air duct system with a fabric air duct and a conical fabric filter.

An air handling system 10 of FIG. 1 is used to heat or cool an area 12 of a building 14. To do this, system 10 includes a blower 16; a heat exchanger 18; a pre-filter 20; a finer, less porous inflatable filter 22; a supply air duct 24; and a return air duct 26. Heat exchanger 18 is schematically illustrated to represent any device for heating or cooling air, such as by electrical resistance or by heat transfer with another fluid, such as refrigerant, water, or glycol. A housing 28 can enclose one or more of the components of system 10.

In operation, blower 16 draws air 30 from area 12, through return air duct 26 and across pre-filter 20, with pre-filter 20 being any conventional filter known to those skilled in the art. Pre-filter 20 can be used to capture the larger dust particles in the air that might otherwise accumulate on heat exchanger 18 and blower 16. Pre-filter 20 also helps prevent large dust particles from quickly plugging up the less porous filter 22 in supply air duct 24.

After the air passes through pre-filter 20, blower 16 draws the air across heat exchanger 18. Blower 16 then discharges the air through inflatable filter 22, through supply air duct 24, and into area 12 through the pores or other openings in supply duct 24. Filter 22, being relatively fine, can be used to remove smaller dust particles that were able to pass through pre-filter 20. In some embodiments, the fabric material of filter 22 is provided by 3M of St. Paul, Minn., and has a standard particle removal efficiency of 80 to 90%, at 150 to 300 cfm/ft$^2$, with a static pressure drop of 0.2 inches of water.

Figure 2:
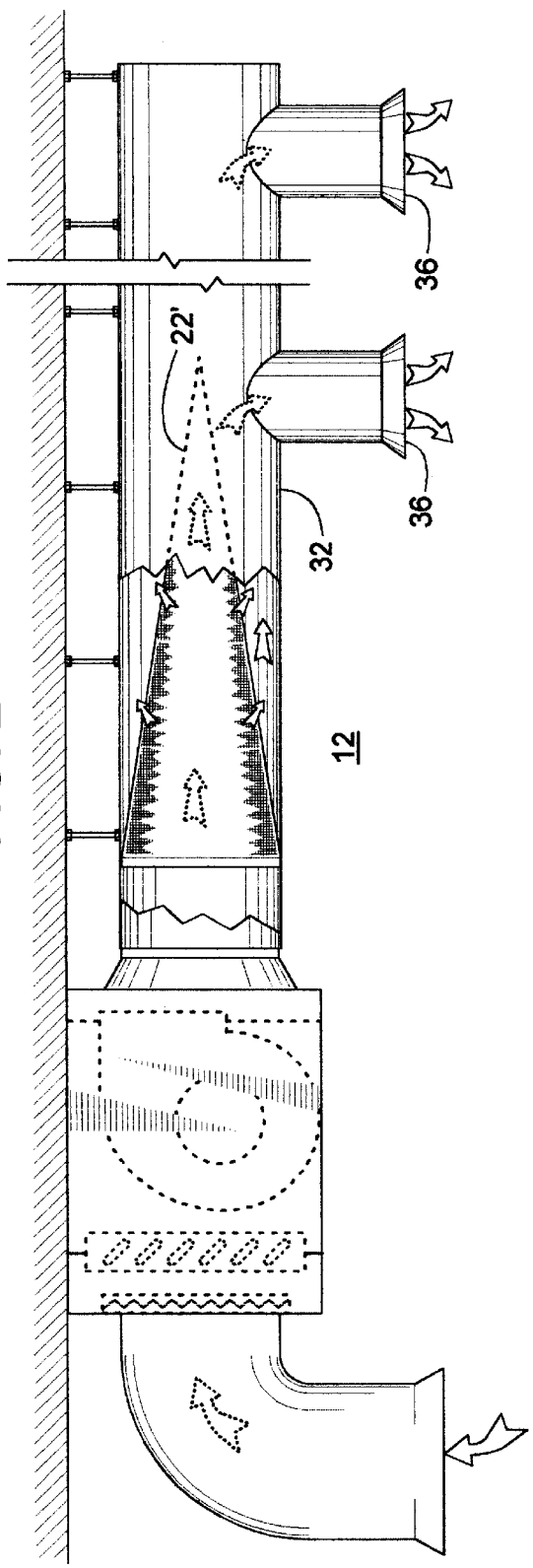
FIG. 2 is a cutaway view of an air duct system with a relatively rigid air duct and a conical fabric filter.

Conical fabric filters, such as filter 22, can be installed within various types of ducts. The supply air duct can be made of sheet metal or some other relatively rigid material, as is the case of conical filter 22' in supply air duct 32 of FIG. 2, or can be made of a pliable fabric 34, as is the case of duct 24. With a metal air duct, air registers 36 provide one or more openings for air to discharge into area 12. As an alternative or in addition to registers 36, the fabric of air duct 24 may be air-permeable and/or be provided with cutouts or discharge openings 38 that deliver air to area 12. Examples of fabric air duct 24 are disclosed in U.S. Pat. Nos. 5,655,963 and 5,769,708, which are specifically incorporated by reference herein.

Figure 3:
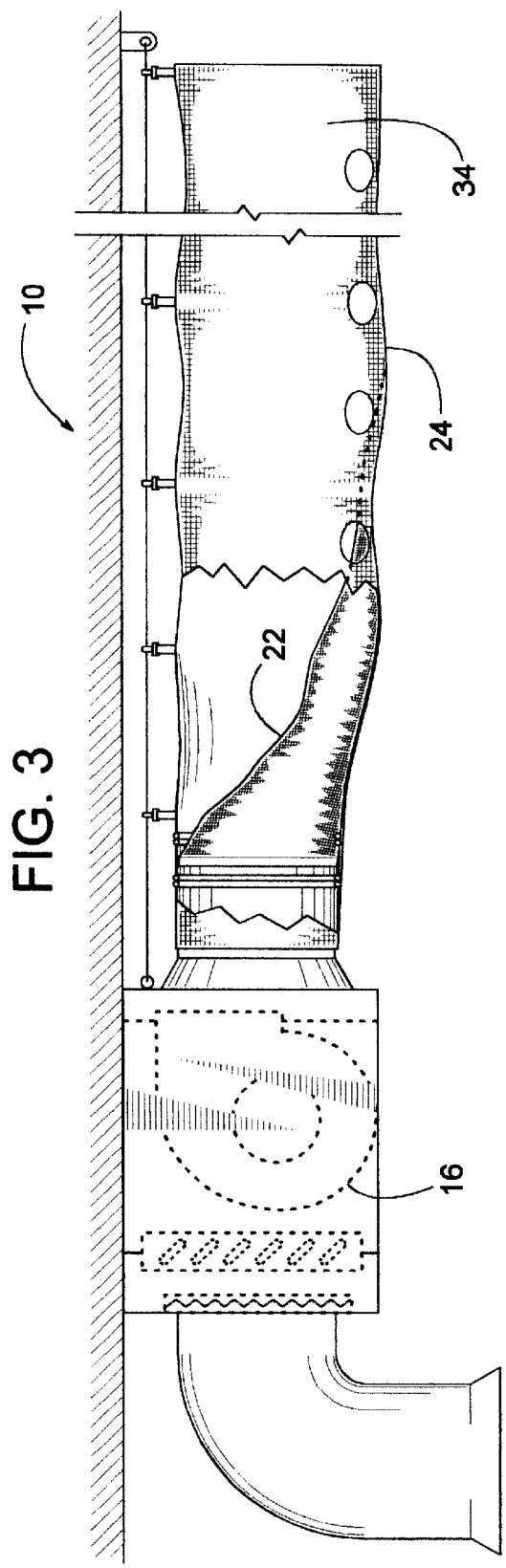
FIG. 3 is similar to FIG. 1, but with the fabric duct and filter deflated.

In the example of FIG. 1, the fabric wall of duct 24 has a generally cylindrical or tubular shape when inflated by the discharge pressure of blower 16. However, when the heating or cooling demand of area 12 has been satisfied, blower 16 may turn off, which deflates filter 22 and leaves the fabric walls of duct 24 hanging relatively limp, as shown in FIG. 3. Some fabric air ducts have a rigid frame that helps hold the fabric walls of the duct in a generally tubular shape even when the blower is not running. Such frame-supported ducts are also well within the scope of the invention.

Figure 4:
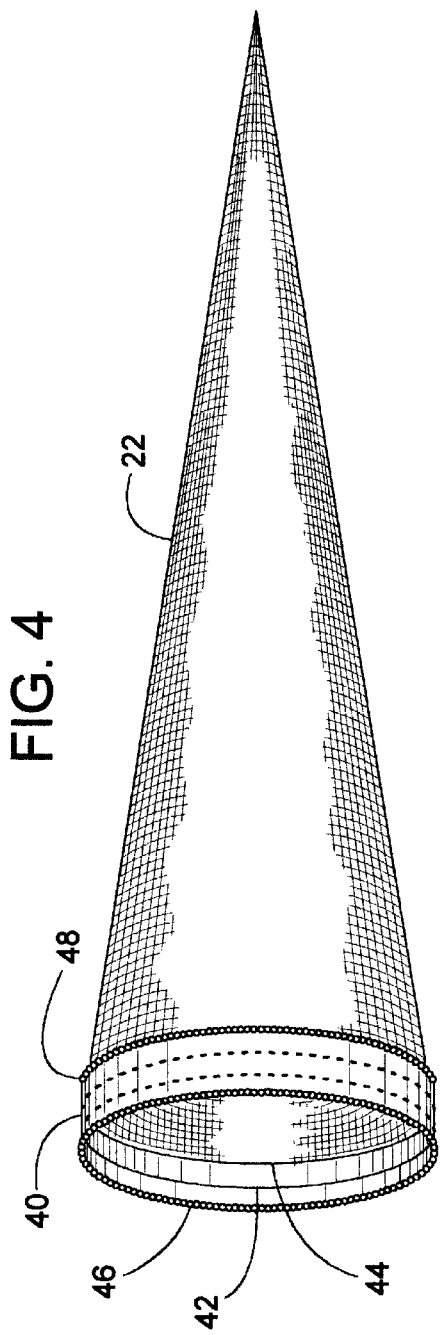
FIG. 4 is a perspective view of the filter used in the air duct system of FIG. 1.
Figure 5:
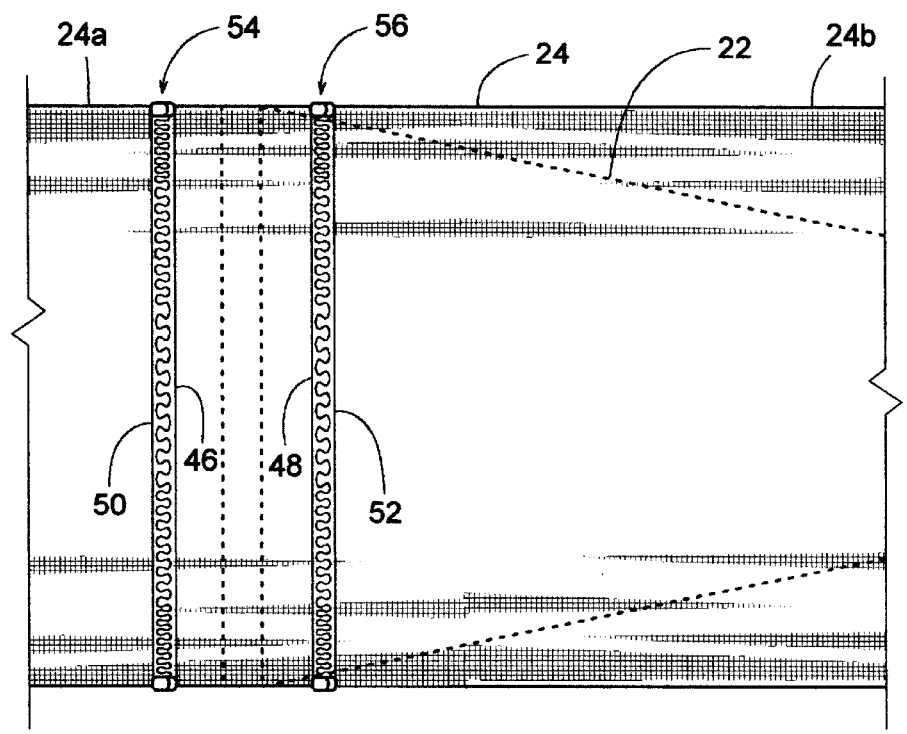
FIG. 5 is a closer up view of the supply air duct and conical filter of FIG. 1.
Figure 6:
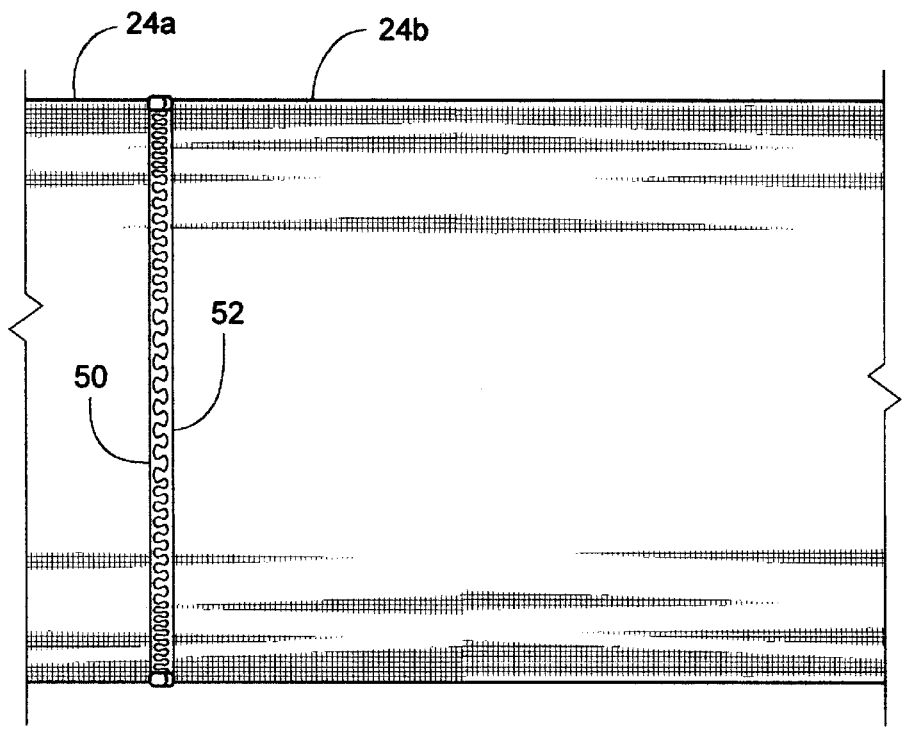
FIG. 6 is similar to FIG. 5, but with the filter removed and two sections of the supply air duct zipped together.

Filter 22 can be installed within an air duct (metal or fabric, supply or return) in various ways. In a currently preferred embodiment, a collar 40, made of fabric or some other material, couples filter 22 to a first segment 24a and a second segment 24b of fabric air duct 24. Referring further to FIG. 4, fabric rim 42 at a base 44 of filter 22 is sewn or otherwise attached to the interior of collar 40. Collar 40 includes two half-zippers 46 and 48 that removably interlock with mating half-zippers 50 and 52 on supply air duct 24, as shown in FIG. 5. Half-zippers 46 and 50 comprise a first zipper 54, and half-zippers 48 and 52 comprise a second zipper 56. Zippers 54 and 56 allow filter 22 to be temporarily removed from duct 24 for filter cleaning or replacement. If filter 22 is removed for an extended period, half-zippers 50 and 52 may be zipped together to re-establish a continuous supply air duct, as shown in FIG. 6.

To minimize the pressure drop created by filter 22 and to extend the period between filter cleanings, filter 22 is elongated to provide a large surface area though which the air may pass. This is accomplished by having filter 22, when inflated, be of a generally conical shape (i.e., most of its contour or outer envelope fits the shape of a cone). In some embodiments, filter 22 is in the shape of a cone (i.e., substantially all of its contour or outer envelope fits that of a cone).

To help prevent the fabric walls of duct 24b from fluttering, the velocity and flow direction of the air between the exterior of filter 22 and the interior of duct 24b is kept as smooth as reasonably possible. This can be achieved by installing a conical filter within a cylindrical duct to create an airflow path whose annular cross-sectional area increases gradually from an upstream to a downstream end of filter 22.

Figure 7:
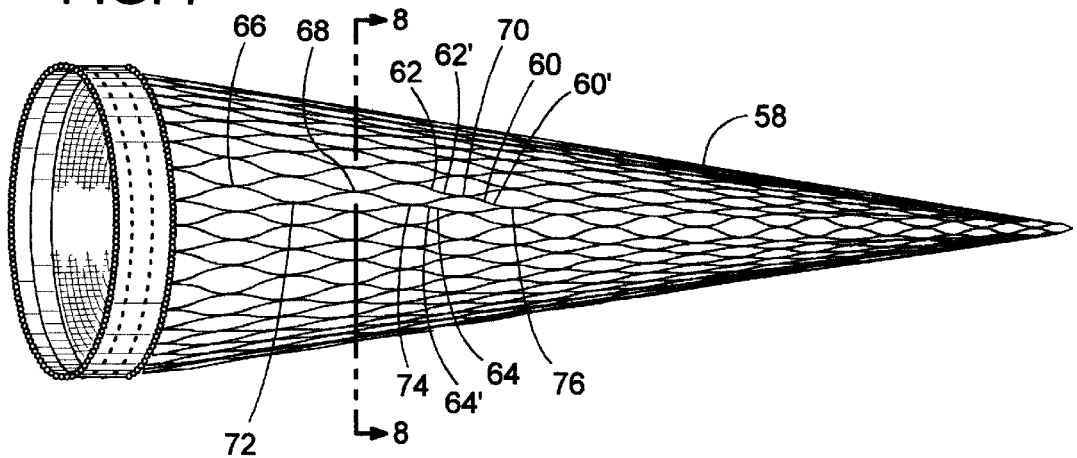
FIG. 7 is similar to FIG. 4, but showing a fabric conical filter that is pleated.
Figure 8:
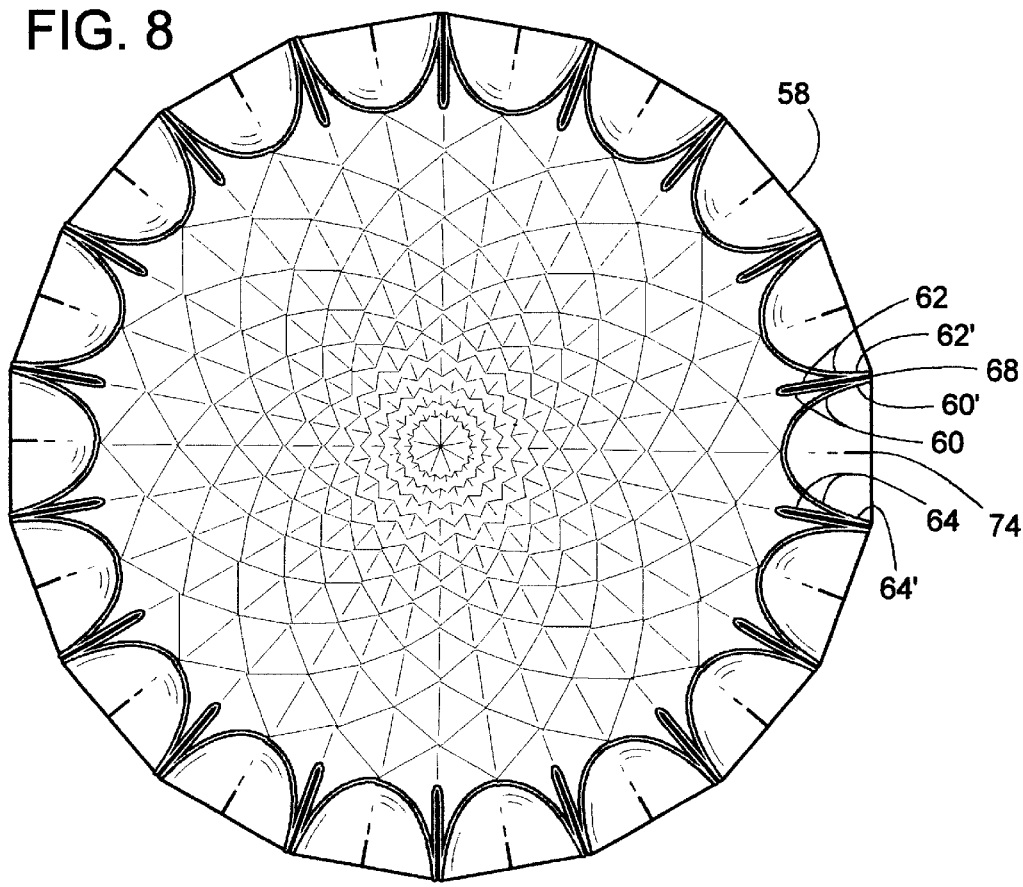
FIG. 8 is a cross-sectional view taken along line 8—8 of FIG. 7.

To provide a conical filter with more surface area, a filter 58 can have a pleated fabric wall, as shown in FIGS. 7 and 8. The pleats run generally lengthwise with each pleat being connected to its two adjacent pleats in an alternating pattern of discrete points. For example, a central pleat 60 lies between a first pleat 62 and a second pleat 64. Central pleat 60 has a central peak 60' that zigzags between an adjacent first peak 62' and a second peak 64' of pleats 62 and 64, respectively. Central peak 60' is attached to first peak 62' at points 66, 68 and 70. Central peak 60' is also attached to second peak 64' at points 72, 74 and 76. The alternating pattern of connection points inhibits the blower's discharge air pressure from flattening the pleats and restrains filter 58 to a generally conical shape.

To provide a plurality of conical filters that provide the same flow rate for a given area of filter material regardless of the duct's diameter, each filter's length to diameter ratio is the same. For example, in FIG. 9, a filter 78 in a first duct 80 has a diameter 82 of 24 inches, as measure along a base 84 of conical filter 78, and has a length 94 of 120 inches, as measured from a center 86 of base 84 to an apex 88 of filter 78. Similarly, in FIG. 10, a filter 90 in a larger duct 92 has a diameter 96 of 48 inches and a length 98 of 240 inches, whereby both filters 78 and 90 have a length to diameter ratio of five (120/24=5, and 240/48=5).

Although the invention is described with reference to a preferred embodiment, it should be appreciated by those skilled in the art that various modifications are well within the scope of the invention. Therefore, the scope of the invention is to be determined by reference to the claims that follow.

We claim:

1. An air duct system for conveying and filtering a stream of air, comprising:

an air duct adapted to convey the stream of air, the air duct having a generally tubular shape and comprising a fabric wall;

an inflatable filter having a generally conical shape when inflated and attached to the fabric wall such that substantially the entire stream of air that passes through the air duct also passes through the inflatable filter;

a first zipper that couples the inflatable filter to the air duct;

a second zipper that couples the inflatable filter to the air duct; and a removable collar attached to the inflatable filter and attached to the first zipper and the second zipper, wherein the air duct includes an upstream duct and a downstream duct with the removable collar interposed therebetween via the first zipper and the second zipper.

2. The air duct system of claim 1, wherein the upstream duct is adapted to be connected to the downstream duct if the inflatable filter were disconnected from the air duct.

3. An air duct system for conveying and filtering a stream of air, comprising:

an air duct adapted to convey the stream of air, the air duct having a generally tubular shape and comprising a fabric wall;

an inflatable filter having a generally conical shape when inflated and attached to the fabric wall such that substantially the entire stream of air that passes through the air duct also passes through the inflatable filter; wherein the inflatable filter includes a plurality of pleats that are interconnected to limit the extent to which the inflatable filter may billow; and wherein the plurality of pleats includes a first pleat having a first peak, a second pleat having a second peak, and a central pleat having a central peak and being interposed between the first pleat and the second pleat, wherein the central peak is attached to first peak and the second peak at a first point and a second point respectively, wherein the first point is spaced apart from the second point.

4. An air duct system for conveying and filtering a stream of air, comprising:

an air duct adapted to convey the stream of air, the air duct having a generally tubular shape and comprising a fabric wall;

an inflatable filter having a generally conical shape when inflated and attached to the fabric wall such that substantially the entire stream of air that passes through the air duct also passes through the inflatable filter; and a heat exchanger and a pre-filter, wherein the heat exchanger with respect to a flow direction of the stream of air is downstream of the pre-filter and upstream of the inflatable filter.

5. The air duct system of claim 4, wherein the pre-filter is more porous than the inflatable filter.

6. An air duct system for conveying and filtering a stream of air, comprising:

an upstream duct adapted to convey the stream of air;

a pliable downstream duct adapted to convey the stream of air;

a collar interposed between the upstream duct and the downstream duct;

a filter connected to the collar being adapted to file the stream of air, wherein the filter is generally conical; wherein the filter includes a plurality of pleats that are interconnected to link the extent to which the filter may billow;

wherein the plurality of pleats include a first pleat having a first peak, a second pleat having a second peak, and a central pleat having a central peak and being interposed between the first pleat and the second pleat, wherein the central peak is attached to first peak and the second peak at a first point and a second point respectively, wherein the first point is spaced apart from the second point.

7. An air duct system for conveying and filtering a stream of air, comprising:

an upstream duct adapted to convey the stream of air;

a pliable downstream duct adapted to convey the stream of air;

a collar interposed between the upstream duct and the downstream duct;

a filter connected to the collar and being adapted to filter the stream of air, wherein the filter is generally conical;

a blower and a pre-filter, wherein the blower with respect to a flow direction of the stream of air is downstream of the pre-filter and upstream of the filter; and a heat exchanger and a pre-filter, wherein the heat exchanger with respect to a flow direction of the stream of air is downstream of the pre-filter and upstream of a filter.

8. The air duct system of claim 7, wherein the pre-filter is more porous than the filter.

9. An air duct system for conveying and filtering a stream of air moving from upstream to downstream, comprising:

a pre-filter;

a blower downstream of the pre-filter;

an inflatable filter downstream of the blower;

a first air duct downstream of the inflatable filter;

a first zipper that couples the inflatable filter to the first air duct;

a second air duct upstream of the first air duct and downstream of the blower;

a second zipper that couples the inflatable filter to the first air duct; and a removable collar interposed between the first air duct and the second air duct and being attached to the inflatable filter.

10. An air duct system for conveying and filtering a stream of air moving upstream to downstream, comprising:

a pre-filter;

a blower downstream of the pre-filter;

an inflatable filter downstream of the blower;

a first air duct downstream of the inflatable filter, wherein the inflatable filter includes a plurality of pleats that are interconnected to limit the extent to which the inflatable filter may billow; and wherein the plurality of pleats includes a first pleat having a first peak, a second pleat having a second peak, and a central pleat having a central peak and being interposed between the first pleat and the second pleat, wherein the central peak is attached to first peak and the second peak at a first point and a second point respectively, wherein the first point is spaced apart from the second point.

* * * * *